Feb. 22, 1966   R. E. CLINE   3,236,554
COLLAPSIBLE TRAILER
Filed July 23, 1963   3 Sheets-Sheet 3
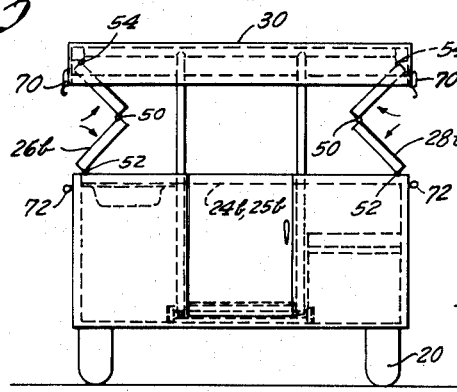
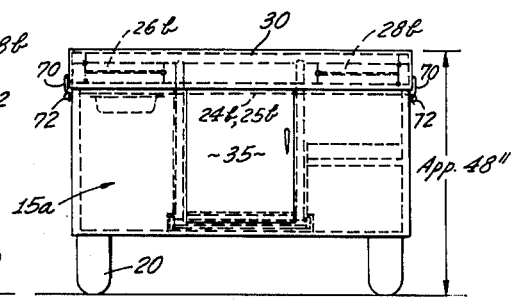
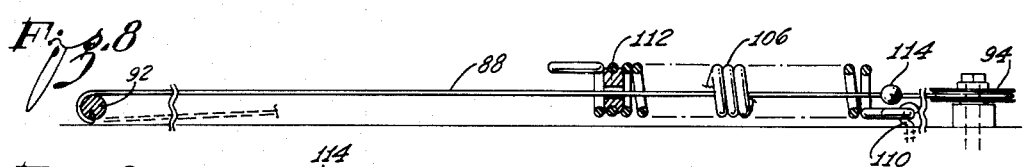
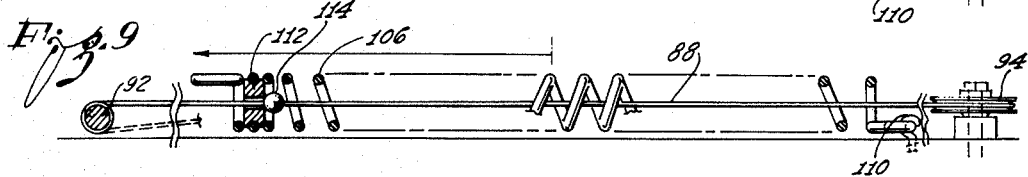
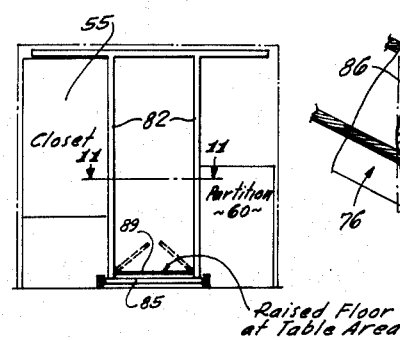
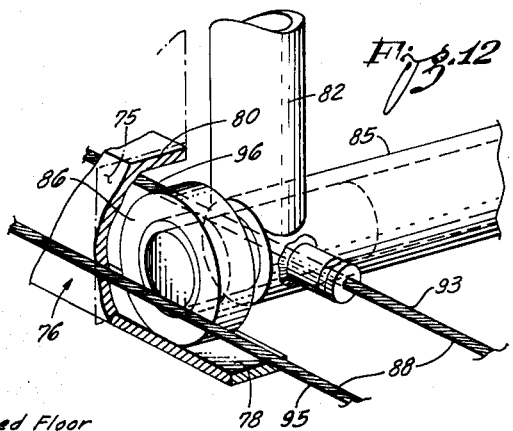
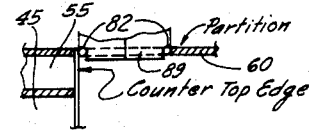
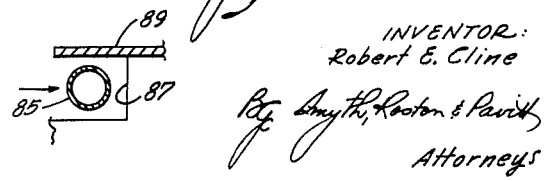
INVENTOR:
Robert E. Cline
Attorneys United States Patent Office 3,236,554
Patented Feb. 22, 1966

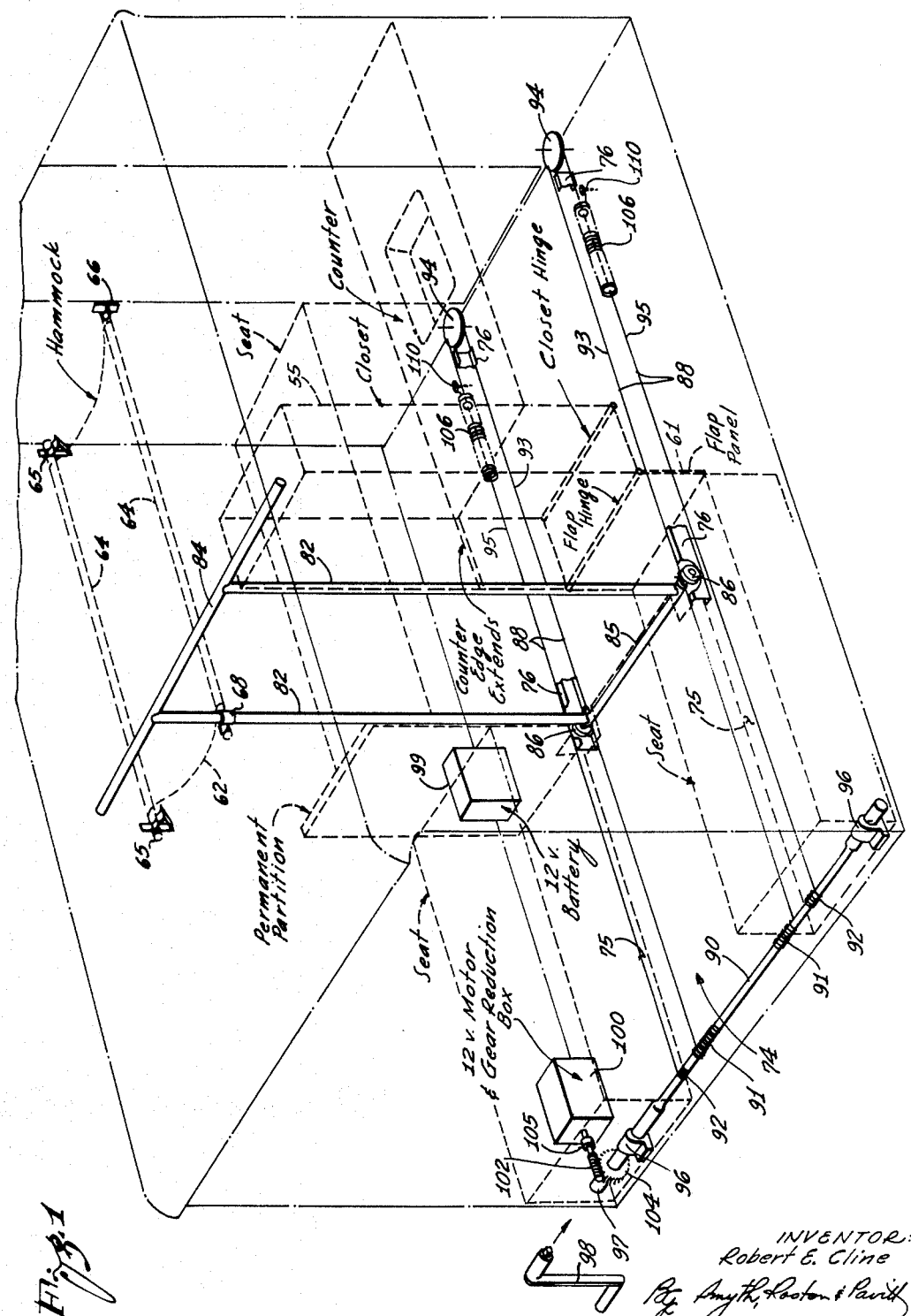

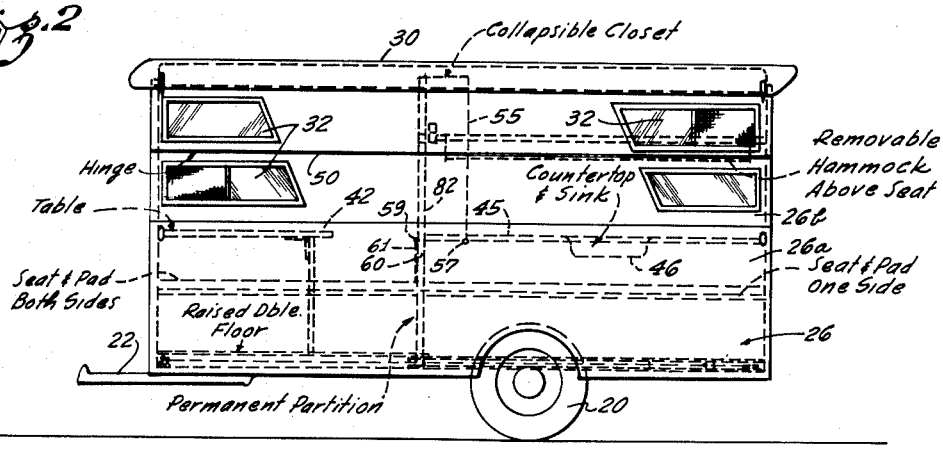
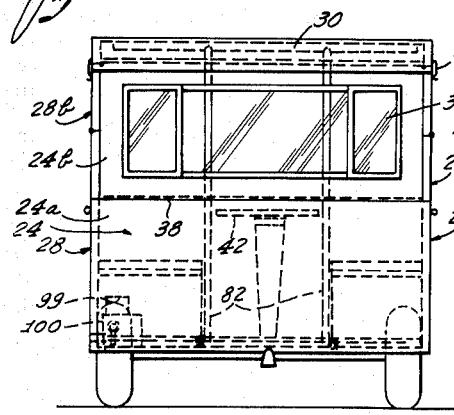
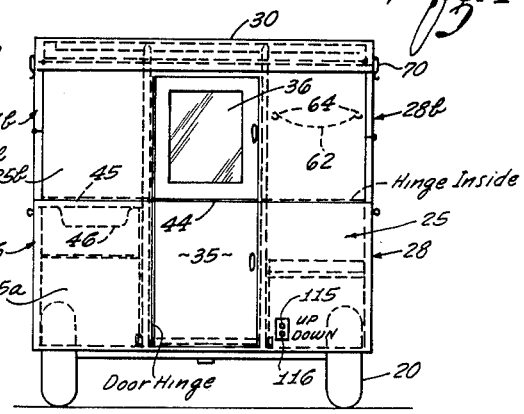
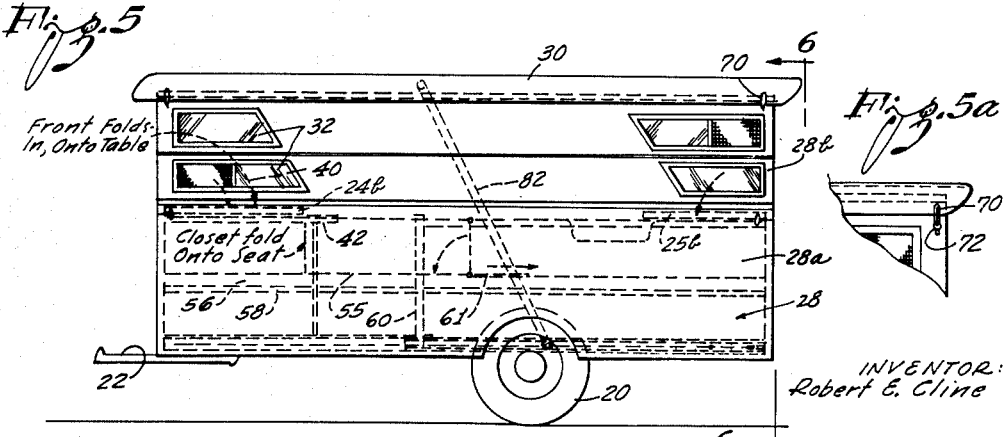

3,236,554
COLLAPSIBLE TRAILER
Robert E. Cline, 5950 Brayton Ave., Long Beach, Calif.
Filed July 23, 1963, Ser. No. 297,011
7 Claims. (Cl. 296—26)

This invention relates to a house vehicle and, more particularly, relates to such a vehicle that is in a normal expanded state when in use as a dwelling and is collapsible to a vertically contracted state for transportation.

While the invention is applicable to various types of vehicles including so-called campers for mounting on pickup trucks, it has been initially embodied in a house trailer. This particular embodiment has been selected for the present disclosure and will provide adequate guidance for those skilled in the art who may have occasion to incorporate the same principles in other types of vehicles.

It is well known that a disadvantage of a vehicle of this type is that it presents large areas in end elevation and in side elevation and, consequently, is subjected to relatively large air pressures. Pressure by a head wind causes substantial resistance to travel, and lateral pressure by a side wind causes a hazardous tendency for the vehicle to tilt and tip over. House trailers are especially vulnerable to lateral wind pressure because they are not as stabilized by their ground wheels as efficiently as automobiles and for the further reason that they lack engines and heavy underframes and consequently have relatively high centers of gravity.

For the purpose of lessening this disadvantage, various vehicle constructions have been contrived that are collapsible in height, the vehicles being expanded to full height for stationary habitation and being contractible to relatively low height for transportation. These prior constructions have not been widely accepted, however, for a number of reasons. In some instances, the collapsible structure is too complicated and expensive. In other instances, the expanded vehicle is structurally inefficient with low strength and stability. In other instances, the burden of expanding and contracting the vehicle is excessive. In still other instances, the collapsible structure imposes too many limitations on the living space in the vehicle.

The present invention meets all the requirements of this situation by a vehicle construction in which a roof is hingedly secured to opposite collapsible walls and novel support means is provided to raise the roof for extension of the collapsible wall. The support means that vertically expands the collapsible structure comprises two elongated support members that straddle a longitudinal passageway inside the vehicle and at their upper ends are pivotally connected to the roof at laterally spaced points. To elevate the roof for vertical expansion of the vehicle from its contracted state to its expanded state, it is necessary merely to move the lower ends of the two support members along horizontal paths along the floor of the vehicle, thereby to shift the support members from inclined retracted positions to upright extended positions. In the preferred practice of the invention, gearing and cable means are employed for actuation of the support structure by battery power.

One feature of the invention is the concept of employing spring means to store energy when the vehicle is collapsed, the stored energy being released to facilitate the raising of the roof for vertical expansion of the vehicle. Preferably, means is provided for this purpose on the cable means to engage and stress a suitable spring means as the support structure approaches its lower limit position. Suitable latch means is provided to hold the roof in its lower position for road travel, and the stressed spring advantageously imposes a load on the latch means to eliminate vibration.

A further feature of the invention resides in provisions for making the erect or unfolded vehicle structure strong and rigid. One provision is the location of fixed structure in the interior of the vehicle to straddle the support structure at the upright position of the support structure, thus to confine the support structure against side sway. Another provision is the use of laterally spaced rollers on the lower end of the support means and the provision of fixed structure overhanging the rollers to prevent elevation of the rollers and thus further reinforce the support means against lateral tilt. This eliminates one of the major problems of the collapsible trailer in that the structure remains stable and upright even though being erected or collapsed in a high wind or on an unlevel hillside where one wheel would be lower than the other.

Other features of the invention relate to the collapsible portions of the vehicle structure. The two side walls and the two end walls have rigid lower portions which form a low rigid open-top box structure. The upper portions of the two end walls swing inwardly and downwardly to retracted positions, and the upper portions of the two side walls are attached to the roof and fold inwardly. In addition, a closet on one side of the interior passageway swings downward into the box structure when the vehicle is collapsed in height.

In the preferred practice of the invention, the upper portions of the end walls swing down to positions supported by table and counter structures inside the vehicle, and the inwardly folded side walls rest on the folded portions of the two end walls. The swingable closet at its lower position rests on a chair or bench surface at a still lower level.

Another feature of the invention is that the structure when in the collapsed or traveling position presents a low silhouette that enables the driver of the towing vehicle to have an unobstructed rear view of the road, thus creating a much safer driving condition and enabling the vehicle to be more easily backed up or parked. The lower silhouette also provides greater clearance from low-hanging obstructions. Also, the higher the side walls of a trailer, the more the vehicle has a tendency to rock and pitch in a forward motion.

The features and advantages of the invention may be understood from the following detailed description together with the accompanying drawings.

In the drawings, which are to be regarded as merely illustrative:

FIG. 1 is a diagrammatic perspective view, partly in phantom, showing the mechanism for raising the roof, to which the two foldable side walls are attached;

FIG. 2 is a side elevation of the vehicle in its vertically expanded state;

FIG. 3 is a front end elevation of the vehicle;

FIG. 4 is a rear end elevation of the vehicle;

FIG. 5 is a side elevational view of the vehicle in partially collapsed state, indicating how a closet inside the vehicle folds down to a low level and indicating how the upper portions of the two end walls swing downwardly into the interior of the vehicle in preparation for the lowering of the roof to collapse the two side walls;

FIG. 5a is an enlarged fragment of FIG. 5 showing a latch means for holding the vehicle structure in the vertically contracted state;

FIG. 6 is a rear end elevation of the vehicle as seen along the line 6—6 of FIG. 5, showing the roof partly lowered with the two side walls partly collapsed;

FIG. 7 is a similar end view showing the vehicle completely collapsed to its minimum vertical dimension;

FIG. 8 is a fragmentary view, partly in elevation and partly in section, showing a spring that stores energy when the roof is lowered, the spring being shown in its relaxed state prior to complete lowering of the roof;

FIG. 9 is a similar view showing the spring stressed for the storage of energy as the roof is completely lowered;

FIG. 10 is a transverse sectional view showing the support means for the roof in its upright or fully extended position;

FIG. 11 is a fragmentary section taken along the line 11—11 of FIG. 10 to show how fixed structure inside the vehicle straddles the support means for the roof at the upright position of the support means to brace the support means against lateral sway or tilt;

FIG. 12 is an enlarged fragmentary perspective view showing how horizontal fixed structure overhangs roller means on the lower end of the support means for the roof to keep the support means from tilting laterally throughout its range of movement; and FIG. 13 is a fragmentary sectional view showing an overhanging step in the floor structure to enclose a cross bar of the support means.

As shown in FIGS. 2, 3, and 4, the vehicle, which is mounted on wheels 20 and is equipped with the usual hitch 22 to serve as a house trailer, has a forward end wall 24, a rear end wall 25, two side walls 26 and 28, and a roof 30. The two side walls 26 and 28 are each provided with suitable windows 32; the forward end wall 24 has a window 34, and the rear end wall 25 provides a doorway closed by a door 35, the door having an upper window 36.

Each of the four walls of the vehicle is divided into a lower fixed section and an upper foldable or collapsible section. Thus, the forward end wall 24 has a lower fixed section 24a and an upper foldable section 24b; the side wall 26 has a lower fixed section 26a and an upper foldable section 26b; the second side wall 28 has a lower fixed section 28a and an upper foldable section 28b; and the rear end wall 25 has a lower fixed section 25a and an upper foldable section 25b. The four lower wall sections 23a, 25a, 26a, and 28a are rigidly mounted and rigidly interconnected to form a relatively low rigid box-like structure.

As indicated in FIG. 3, the upper section 24b of the forward end wall 24 is hinged along the horizontal line 38 to swing downward into the interior of the vehicle as indicated by the dotted arrow 40 in FIG. 5, the wall section folding against the top of a table 42 which is best shown in dotted lines in FIG. 2. In like manner, as shown in FIG. 4, the upper section 25b of the rear end wall 25, including the upper section of the door 35, is hinged along the horizontal line 44 to swing downward into the interior of the vehicle. As viewed in FIG. 4, the left side of the upper wall section 25b comes to rest on a counter top 45 that is equipped with a sink or wash basin 46, and the right half of the upper wall section 25b comes to rest on suitable fixed structure (not shown) inside the vehicle. The upper section of 25b of the rear end wall 25 and the upper section 24b of the forward wall 24 when in up or elevated position are connected by a barrel bolt type latching device (not shown) that forms a rigid connection to the inside end section of the top 30. This arrangement adds rigidity to the structure and also prevents side sway.

Each of the two upper sections 26b and 28b of the two side walls is divided into two longitudinal panels, as may be seen in FIG. 6, which panels fold together at the contracted or collapsed state of the vehicle. The two longitudinal panels are interconnected by a hinge 50 (FIG. 6); the lower panel is connected to the lower fixed structure by a second hinge 52; and the upper panel is connected to the roof 30 by a third hinge 54. When the side walls are fully collapsed, as shown in FIG. 7, the folded side wall panels 26b and 28b come to rest on the previously folded sections 24b and 25b of the two end walls 24 and 25 respectively.

The interior of the vehicle is provided with a normally upright closet 55, shown in dotted lines in FIGS. 1 and 2. In preparation for vertically contracting the vehicle for road transportation, the closet 55 swings or folds downward to come to rest on a pad 56 (FIG. 5) of a bench 58. The closet is attached to fixed structure by a hinge 57 and is attached by a second hinge 59 to a short panel 61 that serves as a leg to hold the closet upright, as shown in FIG. 2. It is to be noted that the folded position of the closet 55 shown in FIG. 5 is below the level of the folded side wall panels. The bench 58 extends the full length of the vehicle but is divided by a fixed partition 60 into sections which may be used as two bunks. A third bunk is in the form of a piece of heavy fabric 62 (FIGS. 1 and 4) stretched between two horizontal rods 64. One of the horizontal rods 64 is mounted on a pair of wall brackets 65. The other horizontal rod is mounted at one end on a wall bracket 66 and is mounted at its other end on a bracket 68. This upper bunk is dismounted and stored below in preparation for the collapsing of the vehicle.

Any suitable means may be provided to latch the described vehicle structure in its collapsed state. For this purpose, the four corners of the roof 30 may be provided with latch members 70, which, as best shown in FIG. 5a, are adapted to releasably engage lugs 72 on the lower fixed sections 26a and 28a of the two side walls 26 and 28 respectively.

The interior of the vehicle has a longitudinal passageway 74, the side walls of which are undercut to provide toe clearance. Thus, as shown in FIGS. 1 and 10, the structure on each side of the passageway 74 forms a longitudinal recess 75 adjacent the floor. Preferably, as shown in FIG. 12, each of the two longitudinal recesses 75 is formed by a channel iron 76 having a lower flange 78 and an upper flange 80.

In the preferred practice of the invention, the roof 30 is raised for vertical expansion of the vehicle by what may be termed a support means comprising two spaced parallel bars or tubes 82 that are pivotally or hingedly connected to the underside of the roof and are adapted to rest at their lower ends on the floor of the vehicle to support the roof. As shown in FIGS. 1 and 10, the upper ends of the two bars 82 may be welded to an upper transverse bar 84 which is suitably journaled on the underside of the roof for the required hinge action. The lower ends of the two bars 82 are connected by a second lower transverse bar 85, and the opposite ends of this lower transverse bar carry corresponding rollers 86 which track in the two channel irons 76.

FIGS. 1, 2, and 10 show the two bars 82 of the rectangular support means in their upright positions at which they support the roof 30 to keep the collapsible structure in its expanded state. At this upright position of the rectangular support structure, the lower transverse bar 85 that carries the two rollers 86 nests out of the way in a transverse recess 87 (FIG. 13) that is formed by a low overhanging step 89 in the floor of the longitudinal passageway 74. The step 89 keeps occupants from stumbling over the lower transverse bar 85 and for this purpose the step is located at the position taken by the lower transverse bar when the rectangular support means is in its upright position shown in FIG. 1.

To lower the roof 30 for collapsing the vehicle, it is merely necessary to swing the lower ends of the two bars 82 away from their normal vertical positions. FIG. 5 indicates an intermediate position of the two bars 82 when the vehicle is only partially collapsed. When the vehicle is fully collapsed, the two bars 82 are at lower inclined positions (not shown), with the lower ends of the bars close to the rear end wall of the vehicle. Conceivably, the two bars 82 may be moved manually to raise and lower the roof 30. In the preferred practice of the invention, however, a suitable force-multiplying mechanism is employed to actuate the two bars 82, such a mechanism being shown in FIG. 1.

FIG. 1 shows two cables 88 on the opposite sides, respectively, of the longitudinal passageway 74, the two cables extending along the interiors of the two channel irons 76, as indicated in FIG. 12. One end of each cable 88 is connected to a transverse shaft 90 and is wound in one direction on the shaft, as indicated at 91, while the other end of the same cable is also connected to the shaft and wound thereon in the opposite direction, as indicated at 92. A first run 93 of each cable 88 extends rearward of the vehicle from the winding 91 to an idler pulley 94 at the rear of the vehicle, and a second run 95 of the cable extends forward from the idler pulley to the second winding 92 on the shaft 90. Thus, rotation of the shaft 90 in one direction causes each cable 88 to move in one direction around the corresponding idler pulley 94, and opposite rotation of the shaft causes opposite movement of the cable.

The first run 93 of each cable 88 is connected to the lower end of the corresponding bar 82 for the purpose of shifting the bar between its upper upright limit position shown in FIG. 1 and its opposite lower retracted position. Thus, rotating the shaft in one direction causes the two bars 82 to lower the roof 30, and rotation of the shaft in the other direction raises the roof. The shaft 90 is mounted in spaced bearings 96 and is provided at one end with a socket fitting 97 which is exposed at the outside of the vehicle to receive a crank 98 for manual rotation of the shaft. It is to be noted that the provision of the step 89 makes it possible to elevate the floor slightly to cover and enclose the runs 93 of the two cables when the vehicle is in its expanded state.

In the preferred practice of the invention, the crank 98 is used only in emergencies, and the shaft 90 is actuated when desired by a suitable motor that is energized by a 12-volt battery 99. In the construction shown in FIG. 1, the 12-volt motor with suitable reduction gearing is mounted in a housing 100 and drives a worm 102 that meshes with a worm gear 104 on the shaft 90. The worm 102 is connected to the motor by a suitable coupling 105 and is disconnected from the worm gear 104 in the event that an emergency makes it necessary to use the crank 98.

Associated with the second run 95 of each of the two cables 88 between the shaft 90 and the corresponding idler pulley 94 is a suitable coil spring 106, the two coil springs serving to store energy when the roof 30 is lowered to collapse the vehicle. As shown in FIGS. 8 and 9, two coil springs 106 concentrically surround the two cable runs 95 respectively, with one end of each spring free and the other end anchored to the floor of the vehicle by a suitable screw 110. The free end of each spring is provided with a bushing 112 which surrounds the cable with small clearance. Mounted on each of the two cables is a ball-shaped body 114 which is so positioned on the cable that it impinges on the corresponding bushing 112 as the two parallel bars 82 swing down. It is apparent from an inspection of FIGS. 8 and 9 that when the operation of contracting the vehicle from its expanded state is started the ball-shaped bodies 114 are spaced away from the bushings 112 and do not reach the bushings until after the operation of contracting the vehicle has been initiated. Thus the ball-shaped bodies 114 cooperate with the corresponding bushings 112 to delay the stressing of the springs when the roof is lowered and when the roof is raised the ball shaped bodies cooperate with the bushings to terminate the stressing of the springs before the vehicle is fully expanded.

The manner in which the actuating mechanism functions may be understood from the foregoing description. Assuming that the vehicle is fully collapsed and it is desired to expand the vehicle vertically to its normal extended state, it is merely necessary to depress an "up" pushbutton 115 (FIG. 4) on the rear of the vehicle and to keep the pushbutton depressed until the roof is fully elevated. The 12-volt motor rotates the shaft 90 to wind in both of the cables 88 simultaneously to pull the lower end of the rectangular support means forward to the position shown in FIG. 1. During the initial portion of this operation, when relatively great force is required, the 12-volt motor is assisted by the two coil springs 106.

To lower the roof 30 for collapsing the vehicle, a second pushbutton 116 is depressed to reverse the rotation of the shaft 90; and with a slight manual force to start the rearward swing of the two bars 82, the weight of the roof is sufficient to force the two bars 82 to their fully retracted positions in opposition to the force exerted by the two coil springs 106. This extending of the spring 106 also presents a safety device in that the extending of the spring counter balances the weight of the roof as it comes down, and if the vehicle were being lowered by the use of the crank 98, the free weight of the top 30 could cause the crank 98 to "run wild," thus endangering the operator.

When the vehicle is in its vertically expanded state and the rectangular support means including the two bars 82 is in its upright position, the rectangular support means is straddled by fixed structure inside the vehicle to keep the two bars 82 and the associated structure from swaying or tilting sidewise. FIG. 11 shows how the previously mentioned fixed partition 60 is contiguous to one of the two bars 82 and shows how the previously mentioned closet 55 in its upright position lies snugly against the counter top edge.

It is also to be noted that since the two rollers 86 are confined or overhung by the upper flanges 80 of the two channels 76, the rectangular support means is additionally secured against sidewise tilt or sway. In this manner, the roof is held in its uppermost position in a stable manner.

A feature of the invention is that at the collapsed state of the vehicle shown in FIG. 7, the roof 30 overhangs and overlaps the previously mentioned rigid box-like structure formed by the four lower wall sections 23a, 25a, 26a and 28a. The special advantage of this construction is that the folded sections of the side and end walls are completely enclosed when the vehicle is in its contracted state to avoid exposure to the weather of the folded wall sections along their hinge lines.

My description in specific detail of the selected embodiment of the invention will suggest various changes, substitutions, and other departures from my disclosure within the spirit and scope of the appended claims.

I claim:
1. A collapsible vehicle having:
   a floor;
   collapsible end and side walls;
   a roof connected to the upper ends of at least some of said walls;
   structure forming a passageway along said floor with vertical structure along the opposite sides of the passageway, said passageway having longitudinal recesses adjacent the floor for toe clearance on the opposite side of the passageway;
   support means comprising two rigidly interconnected spaced support members pivotally connected to the roof at their upper ends centrally of the length of the roof for swinging movement from inclined retracted positions to upright extended positions;
   rotary means supporting the lower ends of the two support members for movement thereof at low frictional resistance, said rotary means tracking in said two longitudinal recesses;
   actuating means to operate said two support members;
   two longitudinal flexible members extending along said two longitudinal recesses respectively and operatively connecting the actuating means with the lower ends of the two support members; and
   fixed structure on opposite sides of the passageway contiguous to the upright positions of the two support members to brace the support members against side sway.

2. In a collapsible vehicle having collapsible side and end walls and a roof connected to at least some of said walls, means to raise the roof to expand the vehicle from collapsed state to expanded state, said raising means comprising:

support means movable from a retracted position to an extended upright position to lift the roof for upward expansion of the vehicle from contracted state, the upper end of said support means being pivotally connected to the roof at laterally spaced points centrally of the length of the roof and the lower end of the support means being movable along laterally spaced substantially horizontal paths to extend the support means from an inclined lower position to an upright extended position;

laterally spaced rotary means supporting the lower end of the support means and positioned to track along said paths respectively; and fixed longitudinal structure overhanging said two paths to confine said rotary means against elevation from the paths thereby to prevent lateral tilt of the support means.

3. In a vehicle of the character described, having an expanded state for habitation and a contracted state for transportation, the combination of:

two side walls;

two end walls;

each of said side and end walls being divided into an upper portion and a lower portion with all of the lower portions interconnected to form a rigid open top box structure;

the upper portions of said end walls being movably mounted on the lower portions of the end walls to swing into the interior of the vehicle for the contracted state of the vehicle;

each of the upper portions of the two side walls being foldable inward on itself for the contracted state of the vehicle;

a roof hingedly connected to the upper ends of the upper portions of the two side walls;

structure inside the vehicle forming a longitudinal passageway;

retractable means to support the roof thereby to hold said side walls unfolded in the expanded state of the vehicle, said retractable means including a pair of bars on the opposite sides respectively of the passageway, the upper ends of said bars being pivotally connected to the roof centrally of the length of the roof and the lower ends being movable along the opposite sides of the passageway to swing the bars to upright limit positions to elevate the roof and to swing the bars to lower inclined retracted positions to lower the roof;

reel means extending transversely of the vehicle;

a pair of cables on opposite sides of said passageway, the two ends of each cable being attached to the reel means and wound in opposite directions on the reel means with each cable formed in two parallel runs, one of the runs of each cable being connected to the lower end of the corresponding bar, whereby rotation of the reel means in one direction causes the two cables to operate the two bars to lift the vehicle roof and rotation of the reel means in the opposite direction retracts the two bars for lowering of the roof;

a pair of springs corresponding to the two cables; and means to stress the two springs in response to the retraction movement of the two bars thereby to store energy in the retracted state of the vehicle for subsequently raising the roof.

4. In a vehicle of the character described, having an expanded state for habitation and a contracted state for transportation, wherein the interior of the vehicle has a central longitudinal passageway, the combination of:

two side walls each being divided into an upper portion and a lower portion;

each of the upper portions of the two side walls being foldable inward on itself for the contracted state of the vehicle with the spacing laterally of the vehicle between the folded upper sections in the contracted state of the vehicle greater than the width of the passageway;

two end walls each divided into an upper portion and a lower portion;

the upper portions of said end walls being hingedly connected to the lower portions of the end walls to swing into substantially horizontal folded positions extending into the opposite ends of the passageway;

the lower portions of the side walls and the lower positions of the end walls being interconnected to form a rigid open-top box structure;

a roof hingedly connected to the upper ends of the upper portions of the two side walls, said roof overhanging and overlapping the rigid open top box structure in the contracted state of the vehicle to completely enclose the upper portions of the side walls and the end walls;

retractable means to support the roof thereby to hold said side walls unfolded in the expanded state of the vehicle, the retractable means being a unitary rigid structure pivotally connected at one of its ends to the roof centrally of the length of the roof with the other end movable along the region of the floor of the passageway in the space in the passageway between the folded upper portions of the end walls to raise and lower the roof;

cable means operatively connected to the retractable means;

reel means to operate the cable mans for operating the retractable means; and spring means operable by the cable means to store energy when the roof is lowered to facilitate subsequent raising of the roof.

5. In a collapsible vehicle having collapsible side and end walls and a roof connected to at least some of said walls, means to raise the roof to expand the vehicle from collapsed state to expanded state, said raising means comprising:

support means movable from a retracted position to an extended upright position to lift said roof for upward expansion of the vehicle from contracted state, the upper end of said support means being pivotally connected to the roof centrally of the length of the roof and the lower end being movable along a low region of the interior of the vehicle to extend the support means from an inclined lower retracted position to a substantially upright extended position;

actuating means operatively connected to the lower end of said support means to move the support means from its inclined retracted position to its upright extended position;

an elongated flexible member operatively connecting said actuating means with the lower end of the support means;

a coil spring anchored at one end for extension and contraction of its other end; and means carried by said flexible member to act on said other end of the spring with delayed action to stress the spring in response to retraction of the support means thereby to store energy for extension of the support means.

6. A collapsible vehicle having:

a floor;

collapsible end and side walls;

a roof connected to the upper ends of at least some of said walls;

means forming a passageway along said floor with vertical structure along the opposite sides of the passageway, said vertical structure having longitudinal recesses adjacent the floor for toe clearance on the opposite sides of the passageway;

support means comprising two support members and at least one transverse member adjacent the floor rigidly interconnecting the two support members, the two support members being spaced laterally of the vehicle and being pivotally connected to the roof at their upper ends centrally of the length of the roof for swinging movement from inclined retracted positions to upright extended positions, said floor having a low overhanging step forming a transverse recess to receive said transverse member at the upright positions of the two support members;

rotary means supporting the lower ends of the two support members for movement thereof at low frictional resistance, said rotary means tracking in said two longitudinal recesses;

actuating means to operate said two support members; and two longitudinal flexible members extending along said two longitudinal recesses respectively and operatively connecting the actuating means with the lower ends of the two support members.

7. A collapsible vehicle having:

a floor;

collapsible end and side walls;

a roof connected to the upper ends of at least some of said walls;

means forming a passageway along said floor with vertical structure along the opposite sides of the passageway, said vertical structure having longitudinal recesses adjacent the floor for toe clearance on the opposite sides of the passageway;

support means comprising two rigidly interconnected support members spaced laterally of the vehicle and pivotally connected to the roof at their upper ends centrally of the length of the roof for swinging movement from inclined retracted positions to upright extended positions;

rotary means supporting the lower ends of the two support members for movement thereof at low frictional resistance, said rotary means tracking in said two longitudinal recesses;

actuating means to operate said two support members;

two longitudinal flexible members extending along said two longitudinal recesses respectively and operatively connecting the actuating means with the lower ends of the two support members;

a coil spring anchored at one end for extension and contraction on the other end; and means carried by at least one of said flexible members to act on said other end of the spring to stress the spring in response to retraction of the support means thereby to store energy for extension of the support means.

References Cited by the Examiner

UNITED STATES PATENTS

| | | | |
|---|---|---|---|
| 1,972,415 | 9/1934 | Anderson | 296—26 |
| 2,193,352 | 3/1940 | Thomas | 296—23 |
| 2,483,332 | 9/1949 | Brumbaugh | 297—27 X |
| 2,798,760 | 7/1957 | Hille | 296—23 |
| 2,990,214 | 6/1961 | Watson | 296—23 |
| 3,050,331 | 8/1962 | Mansen | 296—27 |

BENJAMIN HERSH, *Primary Examiner.*

A. HARRY LEVY, MILTON BUCHLER, *Examiners.*